Figure 1:
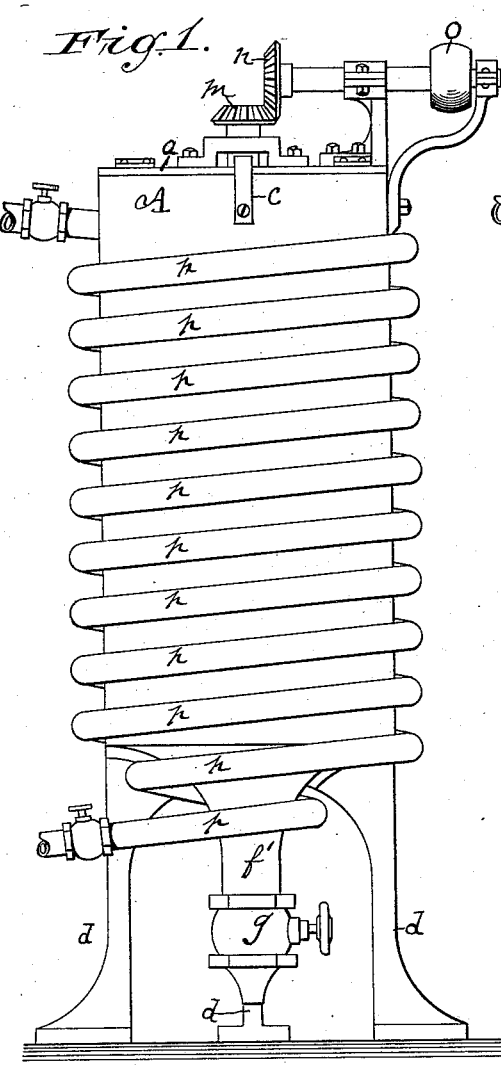

(No Model.)

C. E. ONGLEY.
METHOD OF PREPARING SALT FOR TABLE USE.

No. 462,730. Patented Nov. 10, 1891.

Attest:
C. M. Benjamin
John G. Agar

Inventor:
Charles E. Ongley
by D. Walter Brown
his Attorney

UNITED STATES PATENT OFFICE.

CHARLES E. ONGLEY, OF NEW YORK, N. Y., ASSIGNOR, BY DIRECT AND MESNE ASSIGNMENTS, OF PART TO OSMAR D. BALLERT AND ALEXANDER M. CHISHOLM, BOTH OF SAME PLACE.

METHOD OF PREPARING SALT FOR TABLE USE.

SPECIFICATION forming part of Letters Patent No. 462,730, dated November 10, 1891.

Application filed March 11, 1891. Serial No. 384,543. (No model.)

*To all whom it may concern:*

Be it known that I, CHARLES E. ONGLEY, a citizen of the United States, and a resident of New York, in the county of New York, State of New York, have invented a certain new and useful Improvement in a Method of Preparing Salt for Table Use, of which the following is a specification.

My invention relates to improvements in methods of preparing salt for table use, and the object of my improvement is particularly to so prepare the common salt that it will not cake when exposed to damp air.

It is well known that common salt or sodium chloride has a great affinity for moisture, so that when the atmosphere is damp the salt takes up the moisture from the atmosphere and forms hard compact cakes in the saltcellars and other receptacles in which the salt is placed. In this condition salt is difficult and unpleasant to use. I have, however, invented a method of treating salt with starchy vegetable substances, whereby the savor of the salt is not affected, but its absorption of moisture and its caking are prevented. My tests show that salt treated by my process can be exposed for weeks to the action of very damp air without caking or being sensibly affected thereby. Even after weeks of such exposure the salt remains in a free granulated or powdered state, suitable for table use.

In general my process consists in mixing with the common salt when in a powdered or granulated condition a small proportion of vegetable powder, flour, or meal, preferably powdered starch, and then exposing the mixture to the action of heat for the purpose of evaporating the moisture of the salt and producing a hot vapor, which reduces the granules of the starchy vegetable substance to a soft and sticky condition, so that said granules cling to the particles of salt, and also for the purpose of hardening said granules of starchy substance on the particles of salt. I commonly use a mixture consisting of ten parts of salt to one part of starch, by weight, but these proportions may be varied somewhat without perceptibly affecting the result. A moderate heat only should be used and applied for a length of time depending on the quantity of salt to be treated at a single operation. The effect of this application of heat is to convert the moisture of the salt into a hot water or hot vapor, which reduces the granules of starchy vegetable substance to a sticky condition, whereby they cling to the particles of salt. These granules then become dry and hard and permanently adherent upon the particles of salt, and by their presence upon the particles of salt prevent the caking of the salt when it is exposed to damp air. At the same time the said coating of vegetable matter is almost imperceptible to the taste, and when the salt is put in the mouth the said coating is immediately dissolved, so that the savor of the salt is as soon apparent to the taste as if the salt had not been treated by my process. Indeed, my tests indicate that the process even increases the pungency of the savor of the salt. It is essential that the starch or other vegetable substance shall be thoroughly mixed with and permeate the mass of salt before heat is applied, so that the starch may come into contact with all the particles of salt. This mixing may be effected by hand, but it is better to use a mixing-machine—as, for example, a cylinder in which revolve paddles, which stir and mix the mass. Heat may be applied very conveniently by winding a steam-coil around the outside of the cylinder; but I do not restrict myself to any apparatus, my process being essentially the mixing of a small proportion of vegetable powder, flour, or meal with a quantity of salt in a powdered or granulated condition and then exposing the admixture to the action of heat, for the purpose of drying the salt and hardening the particles of starch on the particles of salt; and this is my process, by whatsoever apparatus it may be performed. I have, however, in the drawings which accompany this specification indicated a convenient apparatus, which (and the mode of operating the same) I will now describe.

Figure 2:
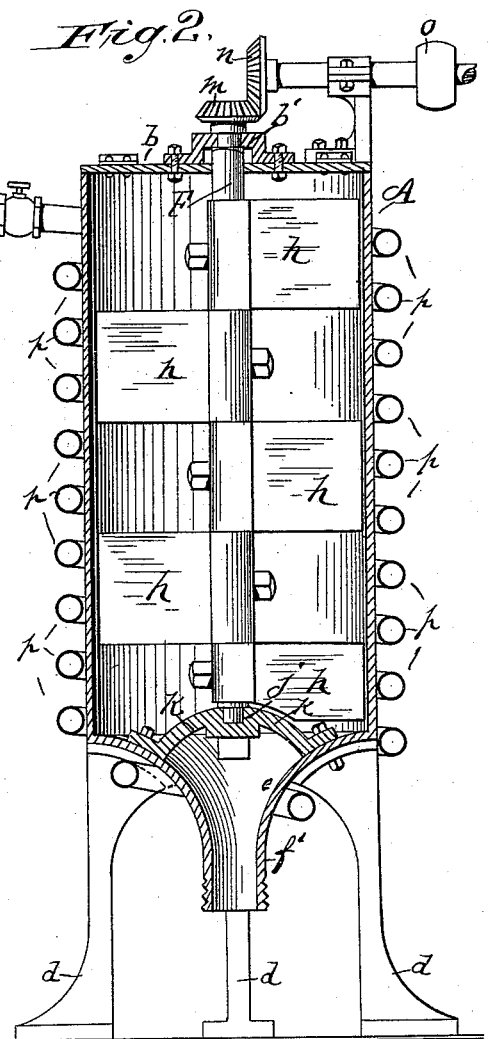
Figure 3:
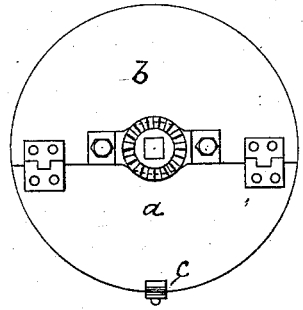

Figure 1 is an external elevation of the apparatus. Fig. 2 is a vertical section showing the shaft and paddles or arms for stirring and mixing the salt and starch. Fig. 3 is a plan view of the top of the apparatus to show the lid of the cylinder.

The salt is put into a cylinder A of metal, and which has a hinged lid $a$ on the top $b$, so as to permit the insertion of the salt and vegetable powder, flour, or meal, which, as stated, is preferably powdered starch, into the cylinder A. There is a catch $c$ to hold the lid tightly shut. Said cylinder A stands in a vertical position on three or more legs $d\ d\ d$, and the bottom $e$ of said cylinder A is of a downwardly-projecting conoidal shape, as seen in the figures, and said bottom $e$ has an outlet-pipe $f'$, on which is a cock $g$ for the purpose of drawing off the contents of cylinder A when the process is completed. A shaft F extends axially through said cylinder A, and fixed on the shaft F are flat vertical arms or paddles $h\ h$. These paddles $h\ h$ are of such length as to almost extend out from the shaft F to the shell of cylinder A; but a small space is left between the outer edge of said paddles $h\ h$ and said shell. Said shaft F is supported at its lower end in a cup or bearing $j$ in the ordinary manner, said bearing $j$ being supported by curved arms $k\ k$, which bend downward and are riveted to the bottom $e$ at their lower extremities. At its upper part said shaft F passes with an easy-working fit through the top $b$ of the cylinder A and through the collar $b'$, which is fixed on the said top $b$, in order to give a strong and durable bearing to the shaft F. On the upper extremity of shaft F is a bevel-gear $m$, which meshes with a bevel-gear $n$, to which motion is imparted in any suitable manner, as by pulley $o$ and a belt. Around the outside of the cylinder A is a steam-coil $p$, which may be connected with any supply of steam and with a drip in the usual manner.

The operation is as follows: A proper quantity of salt, in a powdered or granulated condition, is put into the cylinder A through the opening in the top $b$ and the lid $a$ is closed, steam not being yet turned into the coil $p$, it being essential that heat should not be applied until after the thorough admixture of the starchy substance with the salt, since it is essential to my process that the salt should be damp or wet when the starchy granules are added, so that the starchy granules will adhere to the particles of salt during the subsequent steps of the process. If the salt were first dried before the admixture of the starchy substance, this adherence of the starchy granules upon the salt particles would not take place and the process could not be proceeded with. In general the salt will be naturally sufficiently damp for my process; but if by reason of a long spell of very dry atmosphere the salt should be too dry it may be sprinkled with water, or, preferably, pans of water may be set around the receptacle of salt for the purpose of lading the air with moisture, which will be taken up by the salt. Then the machinery is started, and the shaft F, with the paddles $h\ h$, is revolved at about fifty revolutions per minute. The said paddles $h\ h$ quickly reduce the salt to a powdered or granulated condition. Then the lid $a$ is opened and a quantity of powdered starch, about one-tenth the weight of the salt, is put into the cylinder A and the lid $a$ again closed and the shaft F revolved as before, until the starch is thoroughly mixed and diffused through the salt. The granules of starchy substance thereby become attached to the particles of salt by reason of the moisture of the salt. When the starch is thoroughly mixed through the salt, which will be about fifteen minutes for a bushel or more of salt, steam is admitted to the coil $p$, whereby the moisture of the salt is converted into hot water or hot vapor, which reduces the granules of starchy substance to a soft and sticky condition, whereby the said granules firmly adhere and cling to the particles of salt. Thus, when these granules become dry and hard, the result is particles of salt on which are firmly adherent said granules of starch. The heat should not be intense enough to char the starch or other substance which is used to coat the salt, and I find by experiment that a low heat is quite sufficient to produce the softened condition of the starchy granules above described and to harden the said granules on the salt particles. There is, however, little danger of charring the starch when steam heat is used to dry the salt, as the heat of steam at any ordinary temperature and pressure is not sufficient to injure the starch. The application of the heat should be continued for a length of time depending on the quantity of salt to be treated at a single operation. The completion of the operation of drying and baking may be ascertained by taking a small quantity of the mixture out of the cylinder A and placing it on a piece of cloth and then brushing off the mixture with the hand. If the process is complete, it will brush off very cleanly like a perfectly dry coarse powder. When the heat has been applied for a sufficient time, the cock $g$ is opened and the mixture drawn out. It comes out in appearance very fine white dry salt of superior quality, and, as said, may be exposed to damp air for weeks without caking. Should any of the starch not be taken upon the salt, the residue of starch may be easily blown out, and a fine clean mass of salt particles with adherent granules of starchy particles will remain.

While, as hereinbefore said, I prefer to use starch, other vegetable substances, as wheat flour, may be employed; but starch is the preferable substance.

Having thus described my invention, I claim—

The hereinbefore-described process of preparing salt—to wit, mixing damp salt in a powdered or granulated condition with a small proportion of starchy granules, and thereafter exposing the admixture to the action of heat for the purpose of softening the starchy granules, and then drying the softened granules upon the salt particles, substantially as set forth.

In testimony that I claim the foregoing as my invention I have signed my name, in presence of two witnesses, this 7th day of March, 1891.

CHARLES E. ONGLEY.

Witnesses:
HENRY P. VELTS,
J. JOHN DREW.